United States Patent
Kakinuma et al.

(10) Patent No.: US 9,384,600 B2
(45) Date of Patent: Jul. 5, 2016

(54) VEHICLE DIAGNOSTIC METHOD, AND EXTERNAL DIAGNOSTIC DEVICE

(75) Inventors: Hiroyuki Kakinuma, Saitama (JP); Sakae Ito, Kazo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/349,815

(22) PCT Filed: May 30, 2012

(86) PCT No.: PCT/JP2012/063965
§ 371 (c)(1),
(2), (4) Date: Apr. 4, 2014

(87) PCT Pub. No.: WO2013/061644
PCT Pub. Date: May 2, 2013

(65) Prior Publication Data
US 2014/0257685 A1      Sep. 11, 2014

(30) Foreign Application Priority Data
Oct. 24, 2011   (JP) .................. 2011-232450

(51) Int. Cl.
G07C 5/08        (2006.01)
G01F 9/00        (2006.01)
G01M 17/007      (2006.01)

(52) U.S. Cl.
CPC .............. G07C 5/0808 (2013.01); G01F 9/001 (2013.01); G01M 17/007 (2013.01)

(58) Field of Classification Search
None
See application file for complete search history.

(56) References Cited

U.S. PATENT DOCUMENTS

| 4,839,811 A | 6/1989 | Kanegae et al. |
| 8,140,358 B1 * | 3/2012 | Ling ............... G06Q 40/08 340/439 |
| 8,269,617 B2 * | 9/2012 | Cook ............... G07C 5/085 340/439 |
| 8,996,234 B1 * | 3/2015 | Tamari ............. G08G 1/20 701/123 |
| 2001/0002450 A1 | 5/2001 | Mizutani et al. |
| 2007/0216521 A1 * | 9/2007 | Guensler .......... G08G 1/0104 340/439 |

(Continued)

FOREIGN PATENT DOCUMENTS

JP     63-78041 A     4/1988
JP     01-209334 A    8/1989

(Continued)

OTHER PUBLICATIONS

International Search Report dated Aug. 7, 2012 corresponding to International Patent Application No. PCT/JP2012/063965 and English translation thereof.

*Primary Examiner* — Jonathan M Dager
(74) *Attorney, Agent, or Firm* — Squire Patton Boggs (US) LLP

(57) ABSTRACT

In a vehicle diagnostic method and an external diagnostic device, the acceleration of a vehicle is detected while the vehicle is travelling with an acceleration detection means that is provided to the external diagnostic device mounted on the vehicle, and the external diagnostic device acquires operation information of the vehicle from the vehicle. The external diagnostic device performs at least one of a vehicle performance diagnosis, a driving technique diagnosis of the driver, and a fault diagnosis using the operation information and the acceleration of the vehicle.

8 Claims, 6 Drawing Sheets

(56) References Cited

U.S. PATENT DOCUMENTS

| | | | | |
|---|---|---|---|---|
| 2008/0120175 A1* | 5/2008 | Doering | | B60R 16/0236 705/14.67 |
| 2010/0145571 A1* | 6/2010 | Kwon | | G01C 21/26 701/31.4 |
| 2010/0157061 A1* | 6/2010 | Katsman | | G07C 5/0866 348/149 |
| 2010/0174576 A1* | 7/2010 | Naylor | | G06Q 10/04 701/31.4 |
| 2011/0112870 A1* | 5/2011 | Berg | | G06Q 40/08 705/4 |
| 2011/0202305 A1* | 8/2011 | Willis | | G07C 5/085 702/141 |
| 2012/0065874 A1* | 3/2012 | Sato | | B60R 16/0236 701/123 |
| 2012/0071151 A1* | 3/2012 | Abramson | | H04L 67/12 455/418 |
| 2013/0041521 A1* | 2/2013 | Basir | | B60R 25/33 701/1 |
| 2013/0073114 A1* | 3/2013 | Nemat-Nasser | | B60W 40/09 701/1 |
| 2013/0096731 A1* | 4/2013 | Tamari | | G06F 11/3013 701/1 |
| 2013/0261942 A1* | 10/2013 | McQuade | | F02D 29/02 701/115 |
| 2013/0289798 A1* | 10/2013 | Lee | | G06F 17/00 701/1 |
| 2014/0095016 A1* | 4/2014 | Suganuma | | G07C 5/00 701/32.1 |
| 2014/0136187 A1* | 5/2014 | Wolverton | | G06F 17/30654 704/9 |

FOREIGN PATENT DOCUMENTS

| | | |
|---|---|---|
| JP | 10-170303 A | 6/1998 |
| JP | 2001-188985 A | 7/2001 |
| JP | 2008-134110 A | 6/2008 |
| JP | 2009-109264 A | 5/2009 |
| JP | 2010-008234 A | 1/2010 |
| JP | 2010-223607 A | 10/2010 |

* cited by examiner

DATA COLLECTING PROCESS ON TEST RUN

FUEL MILEAGE CALCULATING PROCESS

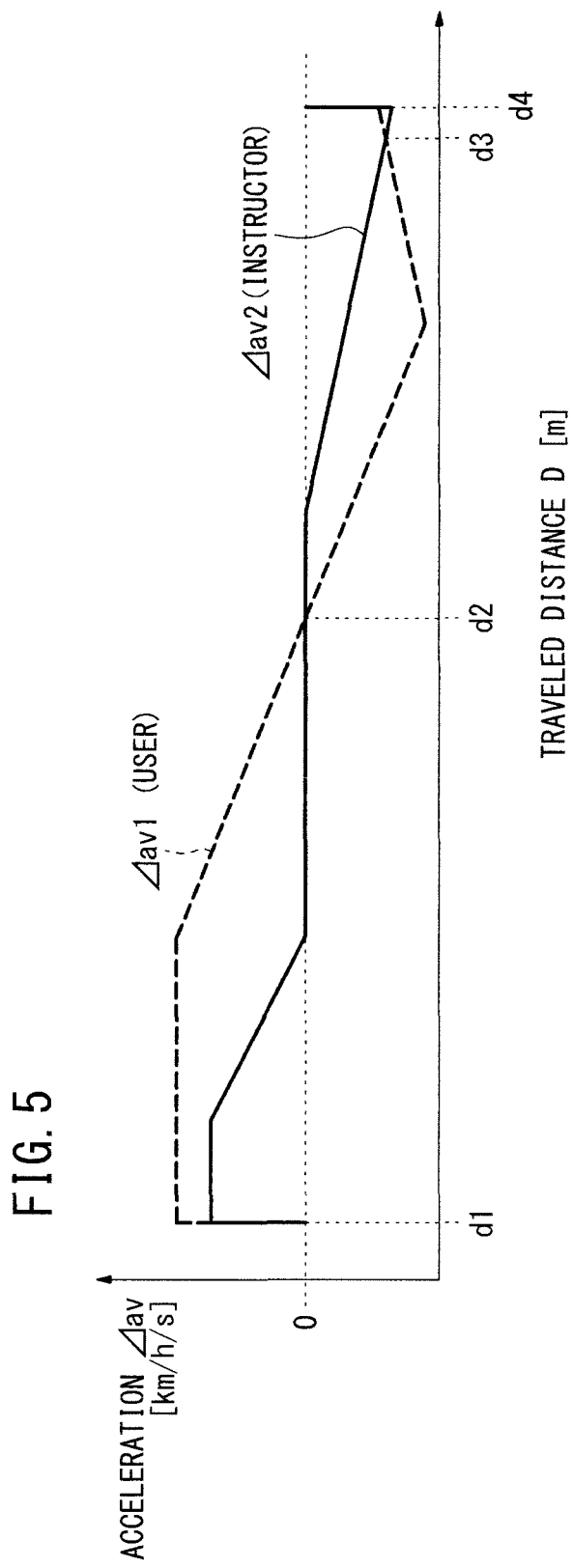

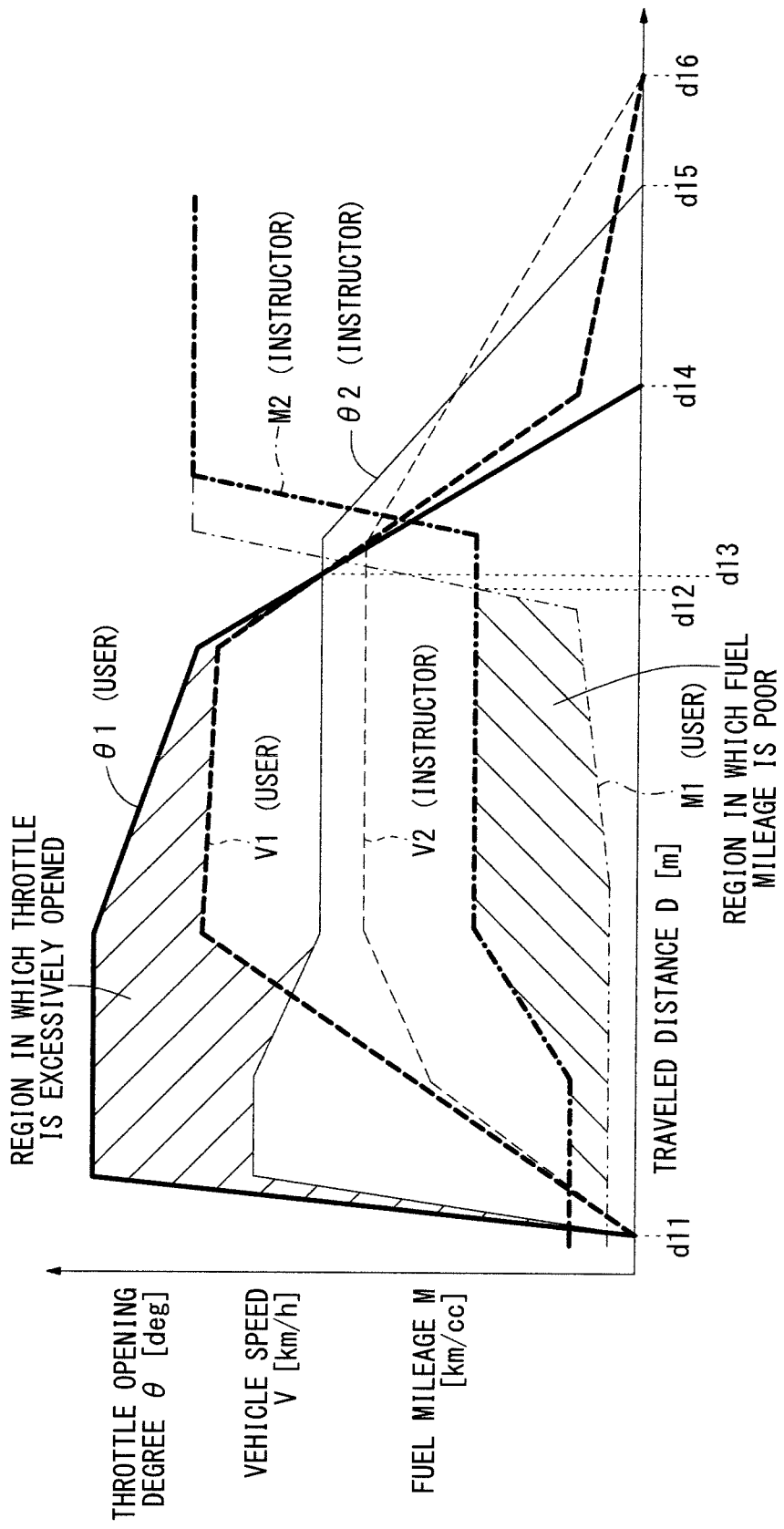

VEHICLE DIAGNOSTIC METHOD, AND EXTERNAL DIAGNOSTIC DEVICE

TECHNICAL FIELD

The present invention relates to a vehicle diagnostic method and an external diagnostic apparatus (device) for making at least one of a fault diagnosis of a vehicle, a performance diagnosis of the vehicle, and a driving technique diagnosis of the driver of the vehicle.

BACKGROUND ART

In recent years, it has become customary to make a diagnosis of fuel mileage or driving behavior of a vehicle based on driving data that are recorded in an electronic control unit (hereinafter referred to as "ECU") installed in the vehicle. For example, in view of the tendency of the user to prefer driving the vehicle with low fuel consumption, driving data (vehicle speed data, etc.) stored in the ECU in the vehicle over a plurality of driving cycles are read, the diagnosis of fuel efficiency or driving behavior of the vehicle is made based on the read driving data, and the results of the diagnosis are presented to the user {see Abstract, a vehicle speed sensor 11A shown in FIG. 1, FIG. 10, and Table 1 of U.S. Patent Application Publication No. 2012/0065874 (hereinafter referred to as "US2012/0065874A1")}.

There has also been proposed a technology for calculating a traveling speed and a traveled distance using an acceleration sensor {see Abstract of Japanese Laid-Open Patent Publication No. 10-170303 (hereinafter referred to as "JP10-170303A")}.

SUMMARY OF INVENTION

For example, vehicles like small motorcycles such as motorcycles for business use have few sensors for detecting the driving state of the vehicles, and are often unable to calculate a fuel mileage on their own. According to a tank-filled-up fuel mileage calculating process (wherein after the tank of a vehicle is filled up, the vehicle is driven over a distance, which is recorded, and then the fuel mileage is calculated based on the amount of fuel added when the vehicle is filled up next time and the recorded distance), the user can calculate a general average fuel mileage, but the user is unable to know how the fuel mileage changes and the driving behavior. According to the technology disclosed in US2012/0065874A1, it is necessary to acquire driving data (vehicle speed data, etc.) for the calculation of a fuel mileage from the vehicle. However, if the vehicle has a mechanical speedometer and cannot output vehicle speed data, then a fuel mileage, etc. cannot be calculated.

External diagnostic apparatus should preferably be able to make a diagnosis of not only fuel mileage and driving behavior but also other diagnostic items.

The present invention has been made under the above circumstances. It is an object of the present invention to provide a vehicle diagnostic method and an external diagnostic apparatus which are capable of efficiently increasing the number of diagnostic items that can be diagnosed, while making use of the configuration of conventional external diagnostic apparatus.

According to the present invention, there is provided a vehicle diagnostic method for acquiring operation information of a vehicle via data communication between an electronic control unit mounted on the vehicle and an external diagnostic apparatus, and causing the external diagnostic apparatus to make at least one of a performance diagnosis of the vehicle, a fault diagnosis of the vehicle, and a driving technique diagnosis of the driver of the vehicle, the vehicle diagnostic method comprising providing an acceleration detecting unit in the external diagnostic apparatus, detecting an acceleration of the vehicle and acquiring, with the external diagnostic apparatus, operation information of the vehicle from the vehicle, while the vehicle is traveling with the acceleration detecting unit mounted on the vehicle, and causing the external diagnostic apparatus to make at least one of a performance diagnosis of the vehicle, a fault diagnosis of the vehicle, and a driving technique diagnosis of the driver of the vehicle, using the acceleration of the vehicle and the operation information.

According to the present invention, while the acceleration detecting unit of the external diagnostic apparatus is moving in unison with the vehicle as the vehicle travels, an acceleration of the vehicle is detected and operation information of the vehicle is sent from the vehicle to the external diagnostic apparatus. The external diagnostic apparatus makes at least one of a performance diagnosis of the vehicle, a fault diagnosis of the vehicle, and a driving technique diagnosis of the driver of the vehicle, using the acceleration of the vehicle and the operation information. Therefore, it is possible to make diagnoses using the detected values from the acceleration detecting unit of the external diagnostic apparatus. Consequently, the number of diagnostic items that can be diagnosed can be increased efficiently while making use of the configuration of the conventional external diagnostic apparatus which acquires operation information via data communication with the vehicle.

The vehicle may comprise an engine vehicle, and the operation information of the vehicle which is sent from the vehicle to the external diagnostic apparatus may include an amount of injected fuel per unit time or per unit number of engine revolutions (hereinafter simply referred to as "amount of injected fuel") and a number of engine revolutions per unit time (hereinafter simply referred to as "engine rotational speed"). The external diagnostic apparatus may calculate an amount of fuel consumed during the detection of the acceleration (hereinafter simply referred to as "amount of consumed fuel"), using the amount of injected fuel and the engine rotational speed, calculate a traveled distance of the vehicle using the acceleration of the vehicle, and calculate a fuel mileage of the vehicle using the amount of consumed fuel and the traveled distance.

Consequently, a fuel mileage can be calculated easily even if the operation information from the electronic control unit of the vehicle lacks enough data to calculate the fuel mileage. Since the fuel mileage is calculated using the amount of injected fuel, time-dependent changes in the fuel mileage can be tracked more easily and the fuel mileage can be calculated more accurately than with a tank-filled-up fuel mileage calculating process. Therefore, it is possible to explain to the user the data of the fuel mileage in comparison with data of others when the user is complaining that the fuel mileage of a motorcycle is poor, for example. Furthermore, if it is judged that different drivers bring on different fuel mileages, then it is possible to give advice about driving behavior (particularly, acceleration and deceleration) problems to be remedied, such as frequent quick acceleration, excessive opening of the throttle, etc.

The external diagnostic apparatus may display data representing how the vehicle is accelerated and decelerated using the acceleration of the vehicle, together with data representing the fuel mileage. By thus indicating the relationship between the acceleration and deceleration of the vehicle and the fuel mileage, it is possible to generate advice data about driving behavior problems to be remedied.

The acceleration detecting unit may be detachably connected to a main body of the external diagnostic apparatus. Therefore, since it is only necessary to install the acceleration detecting unit in the external diagnostic apparatus when a diagnosis is to be made which uses the detected value from the acceleration detecting unit, the main body of the external diagnostic apparatus can easily be reduced in size or can easily be designed for general use.

According to the present invention, there is also provided an external diagnostic apparatus for acquiring operation information of a vehicle through an electronic control unit mounted on the vehicle via data communication with the electronic control unit from outside of the vehicle, and making at least one of a performance diagnosis of the vehicle, a fault diagnosis of the vehicle, and a driving technique diagnosis of the driver of the vehicle, the external diagnostic apparatus comprising an acceleration detecting unit for detecting an acceleration of the vehicle while the vehicle is traveling with the acceleration detecting unit mounted on the vehicle, wherein the external diagnostic apparatus makes at least one of a performance diagnosis of the vehicle, a fault diagnosis of the vehicle, and a driving technique diagnosis of the driver of the vehicle, using the acceleration of the vehicle detected by the acceleration detecting unit and the operation information acquired through the electronic control unit.

The external diagnostic apparatus may further comprise a display unit for displaying data representing how the vehicle is accelerated and decelerated using the acceleration of the vehicle, together with data representing the fuel mileage.

BRIEF DESCRIPTION OF DRAWINGS

FIG. 5 is a diagram showing an example of accelerations displayed on a display unit of the PC; and FIG. 6 is a diagram showing an example of throttle opening degrees, vehicle speeds, and fuel mileages displayed on the display unit of the PC.

DESCRIPTION OF EMBODIMENTS

A. Embodiment:
[1. Configuration]
(1-1. Overall Configuration)

Figure 1:
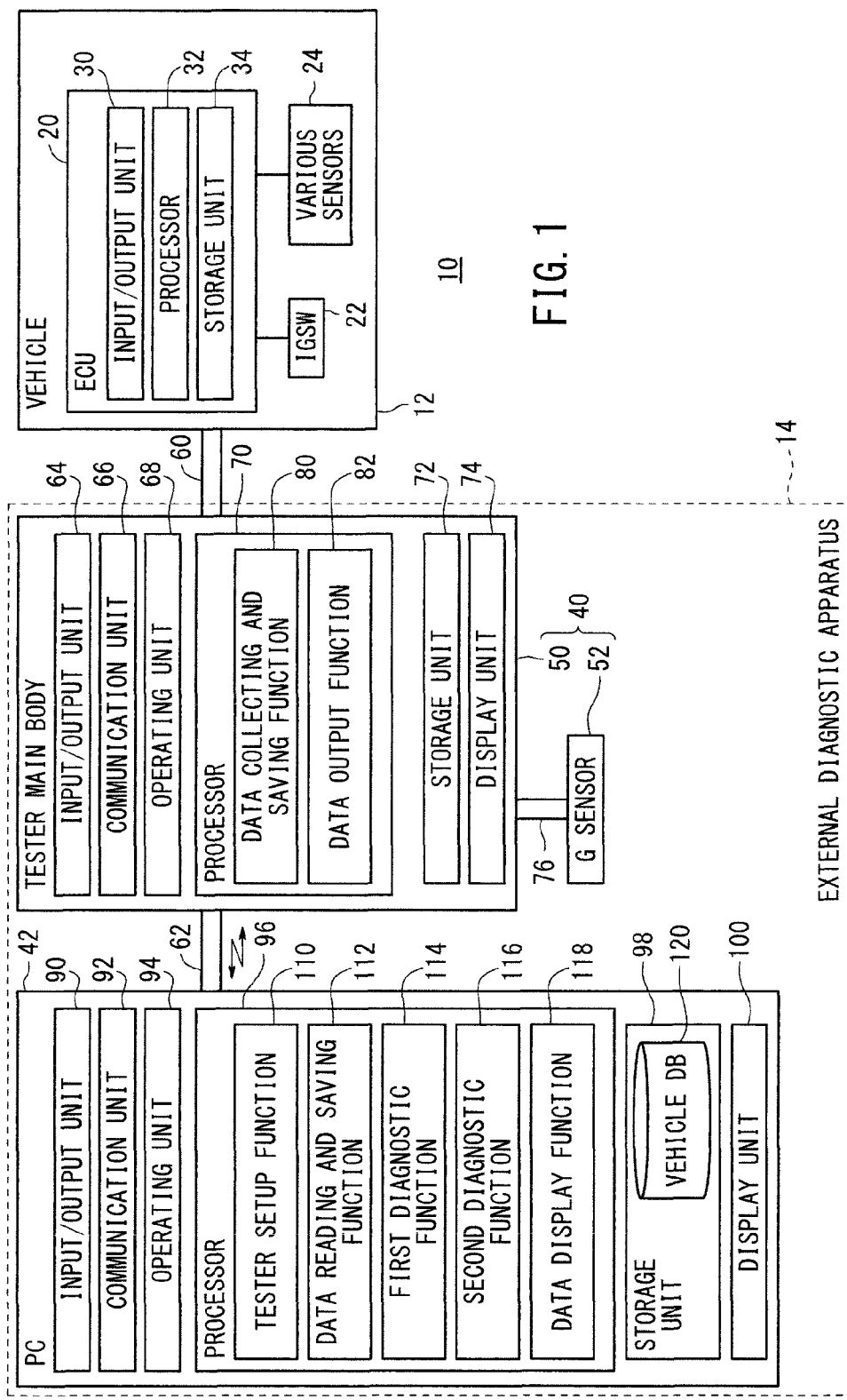
FIG. 1 is a block diagram showing a general configuration of a fault diagnostic system having an external diagnostic apparatus according to an embodiment of the present invention.

FIG. 1 shows in block form a general configuration of a fault diagnostic system 10 (hereinafter referred to as "system 10") having an external diagnostic apparatus 14 (hereinafter referred to as "diagnostic apparatus 14") according to an embodiment of the present invention. The system 10 includes a vehicle 12 (a motorcycle in the present embodiment) as a diagnostic target and the diagnostic apparatus 14 for making various diagnoses of the vehicle 12 from outside the vehicle 12.

(1-2. Vehicle 12)

The vehicle 12 has an electronic control unit 20 (hereinafter referred to as "ECU 20"), an ignition switch 22 (hereinafter referred to as "IGSW 22") for controlling on and off of the ECU 20, and various sensors 24. The ECU 20 serves to control an engine, a transmission, and a brake of the vehicle 12. As shown in FIG. 1, the ECU 20 has an input/output unit 30, a processor 32, and a storage unit 34.

The vehicle 12 according to the present embodiment is a gasoline-powered vehicle having a gasoline engine, not shown. As described later, the vehicle 12 may be a vehicle such as a diesel engine vehicle, an electric vehicle including a hybrid vehicle or a fuel cell vehicle, or the like. Though the vehicle 12 according to the present embodiment is a motorcycle such as a motorcycle for business use or a motorcycle for family use, it may be a three-wheeled vehicle, a four-wheeled vehicle, a six-wheeled vehicle, or the like.

(1-3. External Diagnostic Apparatus 14)
(1-3-1. Overall Configuration)

The external diagnostic apparatus 14 has a tester 40 and a personal computer 42 (hereinafter referred to as "PC 42"). The external diagnostic apparatus 14 is capable of making a fault diagnosis of the vehicle 12, a performance diagnosis of the vehicle 12, and a driving technique diagnosis of the driver of the vehicle 12.

(1-3-2. Tester 40)

The tester 40 is used in various diagnoses (inspections) as a communication interface to be connected to the ECU 20 of the vehicle 12 in a car dealer, a service shop, or the like, for reading data {operation information (driving data)} of the vehicle 12. The tester 40 has a lower processing capability and a smaller storage capacity than the PC 42, but is smaller in size and has better portability than the PC 42. The tester 40 can make, by itself, various diagnoses (or inspections) on the vehicle 12 using the read operation information, and can also save the read operation information and thereafter send it to the PC 42.

As shown in FIG. 1, the tester 40 has a tester main body 50 and an acceleration sensor 52 (hereinafter referred to as "G sensor 52") detachably connected to the tester main body 50. The tester main body 50 has a first cable 60 connected to the ECU 20 of the vehicle 12, a second cable 62 connected to the PC 42, an input/output unit 64 connected to the first cable 60 and the second cable 62 for inputting and outputting signals, a communication unit 66 for performing wireless communication with the PC 42, an operating unit 68, a processor 70 for controlling components of the tester main body 50, a storage unit 72 for storing programs including control programs run by the processor 70 and data, and a display unit 74.

The operating unit 68 has operating buttons, etc. for performing operating processes to send output commands (pseudo signals) to the ECU 20 or the various sensors 24 of the vehicle 12 when necessary.

The processor 70 has a data collecting and saving function 80 and a data output function 82. The data collecting and saving function 80 is a function to collect various data (operation information) from the vehicle 12 through the ECU 20 and save the collected data in the storage unit 72. The data output function 82 is a function to output the operation information saved in the storage unit 72 to the PC 42.

The G sensor 52 is capable of detecting an acceleration [m/s/s] based on a command from the processor 70 of the tester main body 50. According to the present embodiment, when the G sensor 52 is operated in a state where the tester 40 is mounted on the vehicle 12, the G sensor 52 can detect an acceleration Δav [km/h/s] of the vehicle 12. The G sensor 52 is detachably connected to the tester main body 50 by a third cable 76. According to the present embodiment, the third cable 76 comprises a USB cable, for example. Alternatively, instead of the third cable 76, the tester main body 50 and the G sensor 52 may have respective connectors, e.g., USB connectors, and the G sensor 52 may be connected to the tester main body 50 by the connectors.

The display unit 74 displays various data read from the ECU 20 on a monitor screen.

The first cable 60 may be replaced with a wireless communication function. The tester 40 and the PC 42 may communicate with each other through a wired communication link via the second cable 62 and also through a wireless communication link via the communication unit 66. However, the tester 40 and the PC 42 may communicate with each other through either one of the wired communication link and the wireless communication link.

(1-3-3. PC 42)

The PC 42 has an input/output unit 90 connected to the second cable 62 for inputting and outputting signals, a communication unit 92 for performing wireless communication with the tester 40, an operating unit 94 including a keyboard, a mouse, a touch pad, etc., not shown, a processor 96 for controlling components of the PC 42 and making various diagnoses, a storage unit 98 for storing programs including control programs and diagnostic programs run by the processor 96 and also storing data, and a display unit 100 for displaying various information. The PC 42 may comprise, for example, a commercially available laptop personal computer as hardware.

The processor 96 has a tester setup function 110, a data reading and saving function 112, a first diagnostic function 114, a second diagnostic function 116, and a data display function 118.

The tester setup function 110 is a function to set up the tester 40. The data reading and saving function 112 is a function to read operation information saved in the storage unit 72 of the tester 40 and save the read operation information in the storage unit 98 of the PC 42. The first diagnostic function 114 is a function to make a fault diagnosis of the vehicle 12 using the operation information read from the tester 40. The second diagnostic function 116 is a function to make a performance diagnosis of the vehicle 12 and a driving technique diagnosis of the driver of the vehicle 12 using the operation information read from the tester 40. The data display function 118 is a function to display the results of the diagnoses on the display unit 100.

The storage unit 98 includes a vehicle database 120 (hereinafter referred to as "vehicle DB 120"). The vehicle DB 120 stores information representing the model name of the vehicle 12, the model year of the vehicle 12, the place of destination of the vehicle 12, the model code of the vehicle 12, the identification information of the ECU 20 (hereinafter referred to as "ECU ID"), and information as to whether the vehicle 12 has a vehicle speed sensor or not.

For making various diagnoses using the PC 42, the operator connects the first cable 60 of the tester 40 to a connector, i.e., a data link connector, not shown, of the vehicle 12. Using the second cable 62 and the communication units 66, 92, the operator makes the ECU 20 and the PC 42 ready to communicate with each other. Thereafter, in response to operating of the operating unit 94 of the PC 42 by the operator, the PC 42 makes various diagnoses including a fault diagnosis of the vehicle 12, a performance diagnosis of the vehicle 12, and a driving technique diagnosis of the driver of the vehicle 12. The PC 42 can also make a diagnosis of a fuel mileage of the vehicle 12, as described in detail later.

[2. Fault Diagnosis of the Vehicle 12]

A fault diagnosis according to the present embodiment is a process of making a diagnosis of faults of various components of the vehicle 12. The fault diagnosis includes a diagnosis for identifying the cause of a fault that is actually detected in the vehicle 12 (ECU 20) and displayed on an indicator, not shown, of the vehicle 12 and a diagnosis for confirming whether various components of the vehicle 12 are operating normally or not although no fault has been detected in the vehicle 12 (ECU 20). Faults that can be found by the fault diagnosis may be those disclosed in U.S. Patent Application Publication No. 2001/0002450 and Japanese Laid-Open Patent Publication No. 01-209334, for example.

If the vehicle 12 has another acceleration sensor different from the G sensor 52, then the external diagnostic apparatus 14 can diagnose or inspect the detected states (output value, linearity, response, etc.) of the other acceleration sensor by comparing an output signal from the other acceleration sensor and an output signal from the G sensor 52 of the tester 40.

As described later, the external diagnostic apparatus 14 according to the present embodiment can calculate a vehicle speed V [km/h] and a travel distance D [km] of the vehicle 12 using the acceleration $\Delta av$ of the vehicle 12 that is detected by the G sensor 52. If the vehicle 12 has a vehicle speed sensor, then the external diagnostic apparatus 14 can inspect the vehicle speed sensor for its detected states (output value accuracy, linearity, response, deteriorated state, etc.) by comparing a vehicle speed V calculated based on the acceleration $\Delta av$ and a vehicle speed v detected by the vehicle speed sensor. Alternatively, if the vehicle 12 has a road wheel speed sensor, then the external diagnostic apparatus 14 can roughly inspect the road wheel speed sensor for its detected states (output value accuracy, linearity, response, deteriorated state, etc.) by comparing a vehicle speed V calculated based on the acceleration $\Delta av$ and a road wheel speed Vw detected by the road wheel speed sensor. Alternatively, if the vehicle 12 has an odometer, then the external diagnostic apparatus 14 can inspect the odometer for its detected states (output value accuracy, deteriorated state, etc.) by comparing a traveled distance D calculated based on the acceleration $\Delta av$ and a traveled distance d detected by the odometer.

The external diagnostic apparatus 14 according to the present embodiment can calculate a fuel mileage M [cc/km] of the vehicle 12 using the acceleration $\Delta av$ detected by the G sensor 52 and an amount of fuel injected per engine revolution (hereinafter referred to as "amount of injected fuel Afi") [cc/revolution] acquired from the ECU 20. As described later, the amount of injected fuel Afi may be represented by any of various other essentially equivalent indexes such as an amount of injected fuel per unit time [cc/sec], an amount of injected fuel per unit number of engine revolutions [cc/unit number of revolutions], an amount of injected fuel per unit engine rotational angle [cc/rad], etc. If the vehicle 12 has a fuel mileage meter, then the external diagnostic apparatus 14 can inspect the fuel mileage meter for its detected states (output value accuracy, etc.) by comparing a fuel mileage M calculated based on the acceleration $\Delta av$, etc. and a fuel mileage m detected by the fuel mileage meter.

According to the present embodiment, the fuel mileage M refers to an amount of consumed fuel per traveled distance of 1 km (hereinafter referred to as "amount of consumed fuel Afc") [cc/km]. However, the fuel mileage M is not limited to the above insofar as the fuel mileage M may be represented by any of various other essentially equivalent indexes such as an amount of consumed fuel per unit traveled distance [cc/km], a traveled distance per unit amount of consumed fuel [km/cc], etc.

If the vehicle 12 has a fuel mileage meter, then the external diagnostic apparatus 14 can inspect the fuel mileage meter for its detected states (output value accuracy, deteriorated state, etc.) by comparing a fuel mileage M calculated based on the acceleration Δav, etc. and a fuel mileage m detected by the fuel mileage meter.

[3. Performance Diagnosis of Vehicle 12 and Driving Technique Diagnosis of Driver of Vehicle 12]

(3-1. General)

The performance diagnosis according to the present embodiment serves to make a diagnosis of performance of the vehicle 12. The performance to be diagnosed may be a fuel mileage M of the vehicle 12, for example. Alternatively, as described later, electric mileage, acceleration performance, etc. may also be used as the performance to be diagnosed.

The above-mentioned fuel mileage M, the electric mileage, etc. reflect the driving technique of the driver. Consequently, it is possible to diagnose the driving technique of the driver by diagnosing the fuel mileage M, the electric mileage, etc.

(3-2. General Outline of Flow of Fuel Mileage Diagnosis (Work Sequence of Operator))

The general outline of the fuel mileage diagnosis (work sequence of the operator) according to the present embodiment will be described below.

Figure 2:
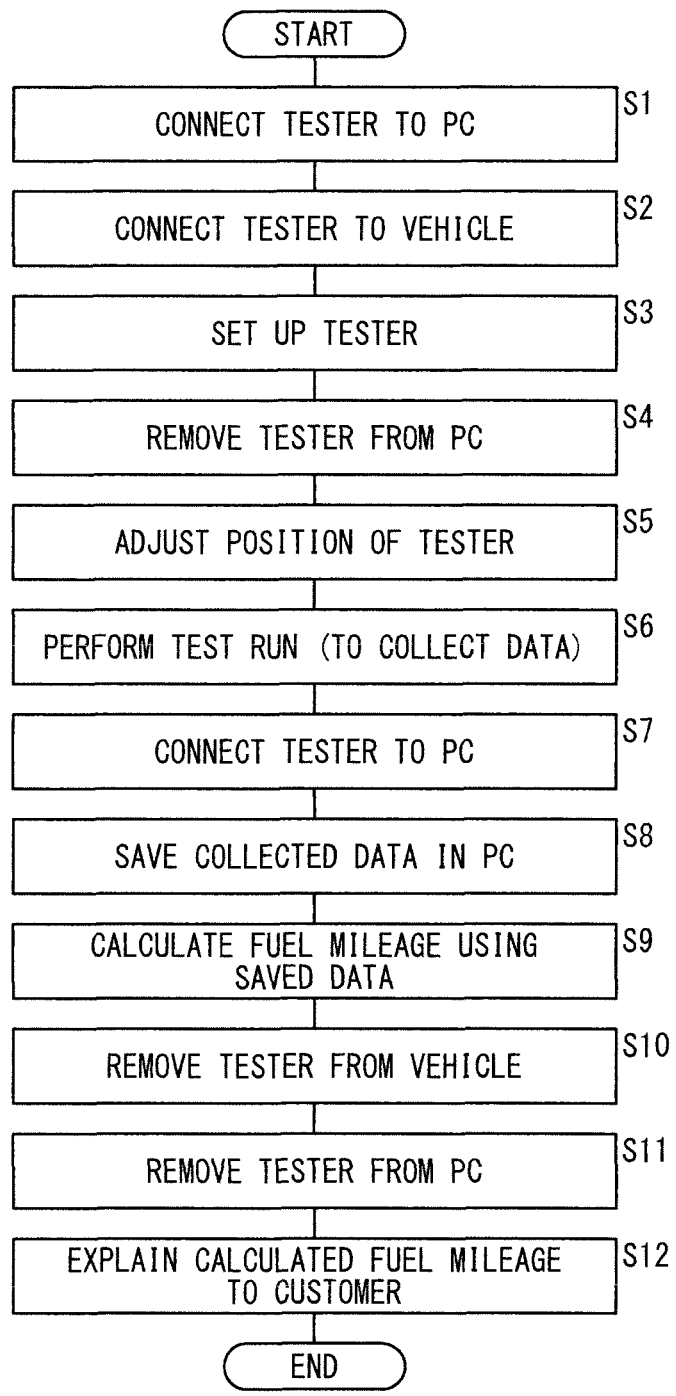
FIG. 2 is a flowchart of a work sequence to be followed by the operator for a fuel mileage diagnosis.

FIG. 2 is a flowchart of a work sequence to be followed by the operator for a fuel mileage diagnosis. In steps S1 through S5, the operator makes advance preparations for a fuel mileage diagnosis. Specifically, the operator connects the tester 40 to the PC 42 with the second cable 62 in step S1. At this time, the tester 40 and the PC 42 are turned on in advance. When the tester 40 and the PC 42 are connected, therefore, they are capable of communicating with each other. If a wireless communication link is to be established between the tester 40 and the PC 42, then the operator uses the operating unit 68 of the tester 40, for example, to instruct the tester 40 to establish the wireless communication link with the PC 42.

In step S2, the operator connects the tester 40 to the ECU 20 of the vehicle 12 with the first cable 60. Specifically, the operator connects the first cable 60 of the tester 40 to the data link connector, not shown, of the vehicle 12. After connecting the first cable 60 to the data link connector, the operator turns on the IGSW 22 to activate the ECU 20. The ECU 20 of the vehicle 12 and the tester 40 are now enabled to communicate with each other.

In step S3, the operator operates the PC 42 to perform the tester setup function 110 to set up the tester 40. At this time, the operator enters setup information into the display unit 100 of the PC 42. The setup information includes identification information {VIN code (VIN: Vehicle Identification Code)} of the vehicle 12, information about a process (fuel mileage diagnosis) to be carried out, etc.

When the setup information is entered, the PC 42 reads information of the vehicle 12 from the vehicle DB 120 by use of VIN code. The read information includes information representing the model name of the vehicle 12, the model year of the vehicle 12, the place of destination of the vehicle 12, the model code of the vehicle 12, the ECU ID, and information as to whether the vehicle 12 has a vehicle speed sensor or not. When the fuel mileage diagnosis is made, the PC 42 confirms whether the vehicle 12 has a vehicle speed sensor or not. If the vehicle 12 does not have a vehicle speed sensor, then the PC 42 displays, on the display unit 100, a message for prompting the operator to install the G sensor 52. The message may be displayed on the tester 40 based on a command from the PC 42.

The PC 42 may judge whether the G sensor 52 is installed on the tester main body 50 or not. If the G sensor 52 is not installed on the tester main body 50, then the PC 42 displays an error message, e.g., a message for prompting the operator to install the G sensor 52, on the display unit 100. Rather than the PC 42, the tester 40 may judge whether the G sensor 52 is installed on the tester main body 50 or not and may display an error message indicating that the G sensor 52 is not installed on the tester main body 50. In that case, the judgment and the display of such an error message may be made in step S4 or step S5 to be described below.

In step S4, the operator removes the second cable 62 from the tester 40 and the PC 42, thereby disconnecting the tester 40 from the PC 42.

In step S5, the operator adjusts the position of the tester 40. Specifically, according to the present embodiment, the detected value from the G sensor 52 of the tester 40 is used to detect the acceleration Δav of the vehicle 12. Therefore, the operator places the tester 40 on the vehicle 12 such that the detecting direction of the G sensor 52 is aligned with a longitudinal direction of the vehicle 12. In this description, the term "places" means "fixes" or "mounts", that is, the operator fixes the tester 40 in its entirety or at least the G sensor 52 to the vehicle 12 or mounts the tester 40 in its entirety or at least the G sensor 52 on the vehicle 12. A mark such as an arrow for indicating the detecting direction of the G sensor 52 may be applied to the G sensor 52 itself for clearly showing the detecting direction of the G sensor 52.

In step S6, the operator carries out a test run of the vehicle 12 in order to determine a fuel mileage M. In the test run, the tester 40 acquires various data required to calculate the fuel mileage M as described in detail later.

In step S7, the operator connects the tester 40 to the PC 42 with the second cable 62. If a wireless communication link is to be established between the tester 40 and the PC 42, then the operator uses the operating unit 68 of the tester 40, for example, to instruct the tester 40 to establish the wireless communication link with the PC 42.

In step S8, the operator operates the PC 42 to save data (collected data) saved by the tester 40 in the PC 42.

In step S9, the operator operates the PC 42 to issue a command for calculating a fuel mileage. In response to the command, the PC 42 calculates the fuel mileage M of the vehicle 12 using the data (saved data) acquired from the tester 40 (details will be described later).

In step S10, the operator removes the first cable 60 from the ECU 20 of the vehicle 12 and the tester 40, thereby disconnecting the tester 40 from the vehicle 12 (ECU 20).

In step S11, the operator removes the second cable 62 from the tester 40 and the PC 42, thereby disconnecting the tester 40 from the PC 42.

In step S12, the operator operates the PC 42 to display data of the calculated fuel mileage M on the display unit 100. The operator then explains the calculated mileage M to the customer based on the displayed data.

(3-3. Data Collection on Test Run (Process in Tester 40))

Figure 3:
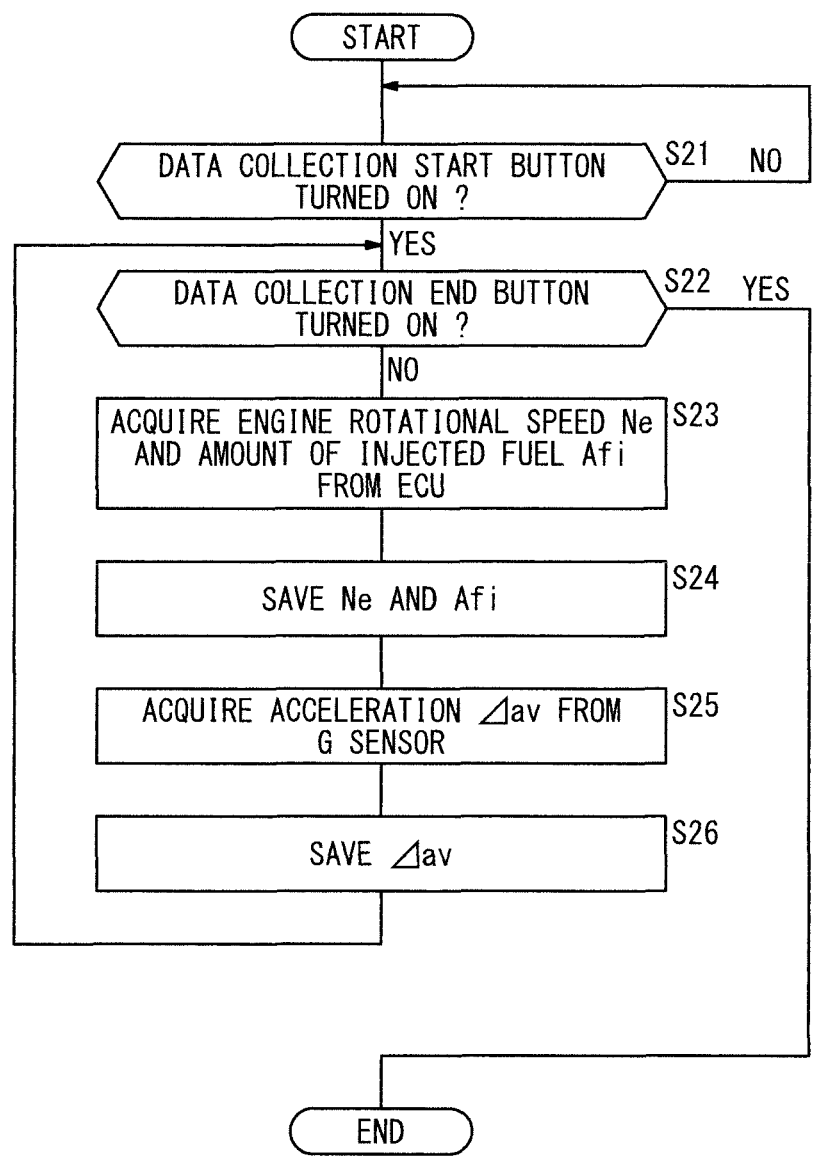
FIG. 3 is a flowchart of a data collecting process carried out by a tester on a test run.

FIG. 3 is a flowchart of a data collecting process carried out by the tester 40 on a test run. Prior to the data collecting process shown in FIG. 3, the operator starts the engine, not shown, of the vehicle 12 using the IGSW 22. In step S21, the tester 40 judges whether a data collection start button, not shown, included in the operating unit 68 has been turned on or not. If the data collection start button has not been turned on (S21: NO), then control repeats step S21. If the data collection start button has been turned on (S21: YES), then control goes to step S22. After having turned on the data collection start button, the operator causes the vehicle 12 to travel.

In step S22, the tester 40 judges whether a data collection end button, not shown, included in the operating unit 68 has been turned on or not. If the data collection end button has not been turned on (S22: NO), then the tester 40 acquires the number of engine revolutions per unit time (hereinafter referred to as "engine rotational speed Ne") [rpm] and the amount of injected fuel Afi from the ECU 20 in step S23. As described above, the amount of injected fuel Afi represents an amount of fuel injected per engine revolution. However, the amount of injected fuel Afi may be represented by any of various other essentially equivalent indexes such as an amount of injected fuel per unit time [cc/sec], an amount of injected fuel per unit number of engine revolutions [cc/unit number of revolutions], an amount of injected fuel per unit engine rotational angle [cc/rad], etc.

In step S24, the tester 40 saves the engine rotational speed Ne and the amount of injected fuel Afi which have been acquired, in the storage unit 72.

In step S25, the tester 40 acquires a detected value from the G sensor 52. As described above, the operator causes the vehicle 12 to travel after having turned on the data collection start button. Therefore, the detected value from the G sensor 52 represents an acceleration Δav of the vehicle 12. In step S26, the tester 40 saves the acquired acceleration Δav in the storage unit 72. Thereafter, control goes back to step S22.

The processing of steps S22 through S26 is carried out cyclically in a predetermined processing period P1, e.g., a fixed period in the range from several microseconds to several seconds. Therefore, the acquired data are spaced at known intervals.

In step S22, if the data collection end button has been turned on (S22: YES), then the tester 40 ends its data collection process.

In steps S24, S26, the tester 40 may save the above-mentioned data in an unillustrated volatile memory of the storage unit 72, and if the data collection end button has been turned on (S22: YES), then the tester 40 may save the data in an unillustrated nonvolatile memory of the storage unit 72.

The data to be collected are not limited to the above-mentioned data, but may also include the opening degree of a throttle, not shown (throttle opening degree), etc., as described later with reference to FIG. 6.

(3-4. Calculation of Fuel Mileage M (Process in PC 42))

Figure 4:
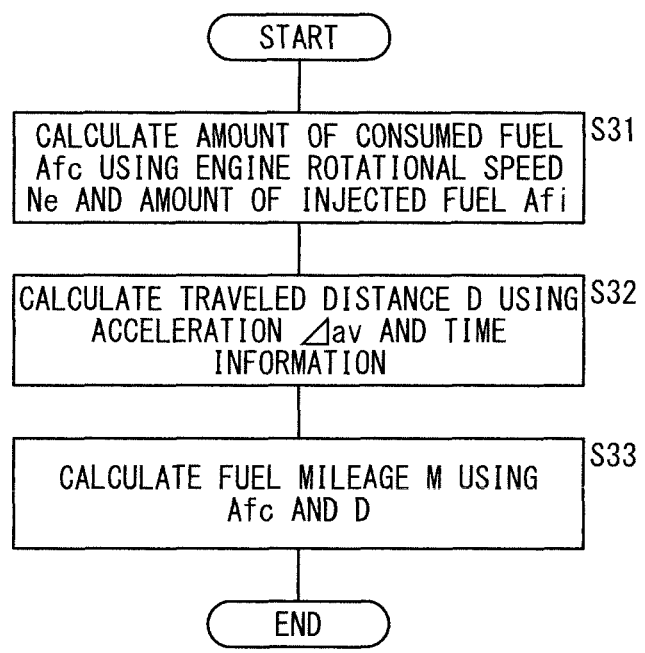
FIG. 4 is a flowchart of a process of calculating a fuel mileage with a personal computer (hereinafter referred to as "PC")

FIG. 4 is a flowchart of a process of calculating a fuel mileage M with the PC 42. As described above with respect to step S9 shown in FIG. 2, the PC 42 starts to calculate a fuel mileage M of the vehicle 12 when the operator operates the PC 42 to issue a run command for calculating a fuel mileage. At the time when the operator operates the PC 42 to issue a run command for calculating a fuel mileage, the PC 42 has acquired data required to calculate a fuel mileage M from the tester 40. Further, the processing of steps S22 through S26 is carried out cyclically in a predetermined processing period P1, e.g., a fixed period in the range from several microseconds to several seconds. Therefore, the acquired data are spaced at known intervals. The fuel mileage M is calculated by the second diagnostic function 116 of the PC 42.

In step S31, the PC 42 calculates an amount of consumed fuel Afc [cc] using the engine rotational speed Ne and the amount of injected fuel Afi. The amount of consumed fuel Afc refers to an amount of fuel that is actually consumed by the vehicle 12 on the test run. According to the present embodiment, the amount of consumed fuel Afc is determined according to the following expression (1):

$$Afc = \int Ne' \times Afi \qquad (1)$$

where Ne' represents the number of engine revolutions per processing period P1 (hereinafter referred to as "engine rotational speed Ne'") [number of revolutions/processing period], which is converted from the engine rotational speed Ne [rpm]. As can be understood from the expression (1), the amount of consumed fuel Afc can be calculated by integrating product of the engine rotational speed Ne' and the amount of injected fuel Afi. If the tester 40 initially acquires the engine rotational speed Ne' from the ECU 20, then the process of converting the engine rotational speed Ne into the engine rotational speed Ne' may be omitted.

In step S32, the PC 42 calculates a traveled distance D of the vehicle 12 using the acceleration Δav and time information {the processing period (the processing period P1) for the acceleration Δav}. Specifically, since the processing period P1 is of a prescribed value, the PC 42 can calculate a change [km/h] in the vehicle speed V and a change [km] in the traveled distance D per processing period P1 by calculating an acceleration Δav per processing period P1 from an initial speed of 0 km/h. It is thus possible to calculate the vehicle speed V at each point of time by integrating the change in the vehicle speed V per processing period P1. It is also possible to calculate the traveled distance D at each point of time by integrating the change in the distance D per processing period P1. Specific processes of calculating a vehicle speed V and a traveled distance D may be those disclosed in JP10-170303A, for example.

In step S33, the PC 42 calculates the fuel mileage M using the amount of consumed fuel Afc calculated in step S31 and the traveled distance D calculated in step S32. Specifically, the fuel mileage M can be determined as the quotient of the traveled distance D divided by the amount of consumed fuel Afc (M=D/Afc). Alternatively, the fuel mileage M may be determined as any of various other essentially equivalent indexes such as the quotient of the amount of consumed fuel Afc divided by the traveled distance D (M=Afc/D).

(3-5. Display of Diagnosis Result (Process in PC 42))

(3-5-1. Displayed Example of Acceleration ΔAv)

FIG. 5 is a diagram showing an example of accelerations Δav displayed on the display unit 100 of the PC 42. In FIG. 5, an acceleration Δav1 refers to the acceleration Δav of the vehicle 12 in a case where the vehicle 12 is driven by the user, e.g., the owner of the vehicle 12, and an acceleration Δav2 refers to the acceleration Δav of the vehicle 12 in a case where the vehicle 12 is driven by an instructor, i.e., a person who can drive the vehicle 12 economically.

When the user sees the displayed example shown in FIG. 5, the user can visually recognize that from a traveled distance d1 to a traveled distance d2, the acceleration Δav1 is too high and accordingly the throttle is opened excessively, and from the traveled distance d2 to a traveled distance d3, the acceleration Δav2 is too low and accordingly the throttle is closed excessively.

As shown in FIG. 5, according to the present embodiment, the PC 42 (data display function 118) can simultaneously display data of a plurality of accelerations Δav1, Δav2 on the display unit 100.

(3-5-2. Displayed Example of Fuel Mileage M, Etc.)

FIG. 6 is a diagram showing an example of throttle opening degrees, vehicle speeds V, and fuel mileages M displayed on the display unit 100 of the PC 42. In FIG. 6, throttle opening degrees θ1, θ2 (hereinafter also collectively referred to as "throttle opening degree θ") represent opening degrees [°] of the throttle, not shown. The throttle opening degrees θ1, θ2 may be acquired by the tester 40 through the ECU 20 during the data collecting process shown in FIG. 3. For example, step S26 shown in FIG. 3 may be immediately followed by a step of acquiring and saving the throttle opening degrees θ1, θ2.

In FIG. 6, the throttle opening degree θ1 refers to the throttle opening degree in a case where the vehicle 12 is driven by the user, and the throttle opening degree θ2 refers to the throttle opening degree in a case where the vehicle 12 is driven by the instructor.

Vehicle speeds V1, V2 are calculated using the acceleration Δav and the time information according to the process described above. The vehicle speed V1 refers to the vehicle speed in a case where the vehicle 12 is driven by the user, and the vehicle speed V2 refers to the vehicle speed in a case where the vehicle 12 is driven by the instructor.

Fuel mileages M1, M2 are calculated according to the above process in step S33 shown in FIG. 4. The fuel mileage M1 refers to the fuel mileage M in a case where the vehicle 12 is driven by the user, and the fuel mileage M2 refers to the fuel mileage M in a case where the vehicle 12 is driven by the instructor.

When the user sees the displayed example shown in FIG. 6, the user can visually recognize that from a traveled distance d11 to a traveled distance d12, the fuel mileage M1 by the user is poor, and that from the traveled distance d11 to a traveled distance d13, the throttle is opened excessively by the user. The user can also visually recognize that the throttle opening degree θ1 by the user is zero at a traveled distance d14, and the throttle opening degree θ2 by the instructor is zero at a traveled distance d15. These differences make it possible for the user to understand that the user and the instructor operate the throttle differently and achieve different vehicle speeds V and different fuel mileages M.

As shown in FIG. 6, according to the present embodiment, the PC 42 (data display function 118) can simultaneously display data of a plurality of throttle opening degrees θ1, θ2, vehicle speeds V1, V2, and fuel mileages M1, M2 on the display unit 100. The data shown in FIG. 5 and the data shown in FIG. 6 may be displayed in combination with each other.

[4. Advantages of the Present Embodiment]

According to the present embodiment, as described above, as the vehicle 12 travels, the G sensor 52 of the external diagnostic apparatus 14 moves in unison with the vehicle 12, and an acceleration Δav of the vehicle 12 is detected and operation information (engine rotational speed Ne, amount of injected fuel Afi, throttle opening degree θ, etc.) of the vehicle 12 is sent from the vehicle 12 to the external diagnostic apparatus 14. Using the acceleration Δav and the operation information, the external diagnostic apparatus 14 makes a performance diagnosis of the vehicle 12, a fault diagnosis of the vehicle 12, and a driving technique diagnosis of the driver of the vehicle 12. Therefore, it is possible to make diagnoses using the detected value from the G sensor 52 of the external diagnostic apparatus 14. Consequently, the number of diagnostic items that can be diagnosed can be increased efficiently while the diagnosis making use of the configuration of the conventional external diagnostic apparatus 14 which acquires operation information (driving data) via data communication with the vehicle 12.

According to the present embodiment, the operation information of the vehicle 12 that is sent from the vehicle 12 to the external diagnostic apparatus 14 includes the amount of injected fuel Afi and the engine rotational speed Ne. The external diagnostic apparatus 14 calculates the amount of consumed fuel Afc using the amount of injected fuel Afi and the engine rotational speed Ne, calculates the traveled distance D using the acceleration Δav, and calculates the fuel mileage M using the amount of consumed fuel Afc and the traveled distance D.

Consequently, the fuel mileage can be easily calculated even if the operation information from the ECU 20 of the vehicle 12 lacks enough data to calculate the fuel mileage. Since the fuel mileage M is calculated using the amount of injected fuel Afi, time-dependent changes in the fuel mileage M can be tracked more easily and the fuel mileage M can be calculated more accurately than with the tank-filled-up fuel mileage calculating process. Therefore, it is possible to explain to the user the data of the fuel mileage M in comparison with data of others when the user is complaining that the fuel mileage M of the vehicle 12 is poor, for example. Furthermore, if it is judged that different drivers bring on different fuel mileages M, then it is possible to give advice about driving behavior (particularly, acceleration and deceleration) problems to be remedied, such as frequent quick acceleration, excessive opening of the throttle, etc.

The external diagnostic apparatus 14 according to the present embodiment displays data representing how the vehicle 12 is accelerated and decelerated (the vehicle speeds V1, V2 in FIG. 6) using the acceleration Δav of the vehicle 12 together with data representing the fuel mileage M. By thus indicating the relationship between the acceleration and deceleration of the vehicle 12 and the fuel mileage M, it is possible to generate advice data about driving behavior problems to be remedied.

According to the present embodiment, the G sensor 52 is detachably connected to the tester main body 50. Thus, it is only necessary to install the G sensor 52 in the external diagnostic apparatus 14 when a diagnosis is to be made by use of the detected values from the G sensor 52. Therefore, the tester main body 50 can easily be reduced in size or can easily be designed for general use.

B. Modifications:

The present invention is not limited to the above embodiment, but may employ various arrangements based on the disclosure of the present description. For example, the present invention may employ the following arrangements:

[1. Objects Incorporating the Invention]

In the above embodiment, the PC 42 is used in combination with the vehicle 12 as a motorcycle. However, the PC 42 may be used in combination with other apparatus (e.g., mobile objects such as ships, aircrafts, or the like).

[2. Configuration of External Diagnostic Apparatus 14]

In the above embodiment, the external diagnostic apparatus 14 comprises the tester 40 and the PC 42. However, it is not limited in this respect insofar as the external diagnostic apparatus 14 may partly or entirely be mounted on the vehicle 12 for data collection, so that the G sensor 52 of the external diagnostic apparatus 14 may detect the acceleration Δav of the vehicle 12. For example, the PC 42 and the tester 40 may integrally be combined with each other if the tester 40 comprises a high-functionality portable terminal device such as a tablet computer, a smartphone, or the like.

In the above embodiment, the PC 42 communicates with the ECU 20 via the tester 40. However, it is not limited to such a configuration. The PC 42 and the ECU 20 may directly communicate with each other through a wireless or wired communication link. Alternatively, a laptop personal computer used as the PC 42 may be arranged to perform the functions of the tester 40.

In the above embodiment, the diagnostic software used by the tester 40 is recorded in advance in the storage unit 72 of the tester 40. However, it is not limited to such a configuration. The diagnostic software may be downloaded from the PC 42 or an external source (e.g., an external server accessible through a public network), or may be executed by an ASP (Application Service Provider) without the need for downloading. The diagnostic software used by the PC 42 is recorded in advance in the storage unit 98 of the PC 42. However, it is not limited to such a configuration. The diagnostic software may be downloaded from an external source (e.g., an external server), or may be executed by an ASP.

In the above embodiment, the fuel mileage M is calculated and displayed by the PC 42. However, the fuel mileage M may be calculated by the tester main body 50 and may be displayed in a simple format directly on the display unit 74 of the tester main body 50. If the display unit 74 of the tester main body 50 thus displays the fuel mileage that varies from time to time, then the tester main body 50 may be used as a training tool for brushing up the driver's ability to drive the vehicle economically wherein the driver drives the vehicle 12 such as a motorcycle or the like while viewing the fuel mileage status displayed on the display unit 74 that is fixed in the vicinity of the meter of the vehicle 12.

[3. G Sensor 52]

In the above embodiment, the G sensor 52 is detachably connected to the tester main body 50. However, it is not limited in this respect, and the G sensor 52 may be incorporated in the tester main body 50. In the above embodiment, the G sensor 52 detects an acceleration along one axis. However, it is not limited to such a sensor, and the G sensor 52 may detect accelerations along two or more axes.

[4. Fault Diagnoses]

In the above embodiment, the external diagnostic apparatus 14 makes several fault diagnoses as examples. However, the external diagnostic apparatus 14 may make one or more of those fault diagnoses. The external diagnostic apparatus 14 may run other fault diagnoses insofar as it uses the acceleration day from the G sensor 52 or the vehicle speed V, the traveled distance D, etc. calculated using the acceleration Δav.

[5. Performance Diagnosis and Driving Technique Diagnosis]

In the above embodiment, the fuel mileage diagnosis is made as the performance diagnosis and the driving technique diagnosis made by the external diagnostic apparatus 14. However, it is not limited in this respect insofar as any performance diagnoses may be made using the acceleration Δav from the G sensor 52 or the vehicle speed V, the traveled distance D, etc. calculated using the acceleration Δav. For example, an electric mileage diagnosis (if the vehicle 12 is an electric vehicle), an acceleration capability diagnosis, an engine performance diagnosis, etc. may be made.

For making an electric mileage diagnosis, an amount of consumed electric power [kWh], instead of the amount Afc of consumed fuel, is determined during the data collecting process, and the traveled distance D of the vehicle 12 is determined according to the same process as in the above embodiment. An electric mileage can then be determined as the quotient of the traveled distance D divided by the amount of consumed electric power (electric mileage [km/kWh]=D/amount of consumed electric power). Alternatively, an electric mileage may be determined as any of various other essentially equivalent indexes such as the quotient of the amount of consumed electric power divided by the traveled distance D (electric mileage [kWh/km]=amount of consumed electric power/D), etc. Furthermore, if the vehicle 12 is an electric vehicle which is free of a transmission and has an in-wheel motor, then the traveled distance D can be calculated from the rotational speed of the motor [rpm]. An electric mileage may thus be calculated from the rotational speed of the motor and the amount of consumed electric power.

For making an acceleration capability diagnosis, a period of time required for the vehicle 12 to reach a vehicle speed of X km/h (X represents a predetermined vehicle speed) at full throttle may be diagnosed, for example. In this case, the tester 40 acquires the throttle opening degree θ through the ECU 20, in addition to the acceleration Δav from the G sensor 52. Alternatively, it is also possible to make a diagnosis of an acceleration response of the vehicle 12 to a change in the throttle opening degree θ. In this case, the tester 40 also acquires the throttle opening degree θ through the ECU 20, in addition to the acceleration Δav from the G sensor 52.

[6. Others]

In the above embodiment, the external diagnostic apparatus 14 makes a fault diagnosis of the vehicle 12, a performance diagnosis of the vehicle 12, and a driving technique diagnosis of the driver of the vehicle 12. However, the external diagnostic apparatus 14 may make either one of the fault diagnosis of the vehicle 12, the performance diagnosis of the vehicle 12, and the driving technique diagnosis of the driver of the vehicle 12. The external diagnostic apparatus 14 may have only the function of a fuel mileage meter or an electric mileage meter.

In the above embodiment, the G sensor 52 is combined with the tester 40 itself. However, the G sensor 52 may not be combined with the tester 40 insofar as the tester 40, not the vehicle 12, is arranged to identify at least one of the acceleration Δav, the vehicle speed V, and the traveled distance D. For example, the tester 40 may have a present position identifying function, and may identify at least one of the acceleration Δav, the vehicle speed V, and the traveled distance D of the vehicle 12 based on information about the present position identified by the present position identifying function. The present position identifying function can be achieved by communicating with a GPS (Global Positioning System), an optical beacon, or the like, for example.

The invention claimed is:

1. A vehicle diagnostic method for acquiring operation information of a vehicle via data communication between an electronic control unit mounted on said vehicle and an external diagnostic apparatus, and causing said external diagnostic apparatus to run at least one of a fault diagnosis of said vehicle, a performance diagnosis of said vehicle, and a driving technique diagnosis of the driver of said vehicle, said vehicle diagnostic method comprising:

providing the external diagnostic apparatus on the vehicle, the external diagnostic apparatus including an acceleration detecting unit, which is connected detachably to or incorporated in a main body of the external diagnostic apparatus;

detecting, with the acceleration detecting unit, an acceleration applied to the external diagnostic apparatus and acquiring, with the external diagnostic apparatus, operation information of the vehicle from the vehicle, while the vehicle is traveling with the external diagnostic apparatus and the acceleration detecting unit mounted on the vehicle; and causing the external diagnostic apparatus to make at least one of the performance diagnosis of the vehicle, the fault diagnosis of the vehicle, and the driving technique diagnosis of the driver of the vehicle, using the acceleration that is applied to the external diagnostic apparatus, and is detected with the acceleration detecting unit and directly sent to the external diagnostic apparatus without any intervention from the electronic control unit, and the operation information of the vehicle acquired with the external diagnostic apparatus.

2. The vehicle diagnostic method according to claim 1, wherein the vehicle comprises an engine vehicle; and the operation information of the vehicle which is sent from the vehicle to the external diagnostic apparatus includes an amount of injected fuel, wherein the amount of injected fuel comprises an amount of injected fuel per unit time or per unit number of engine revolutions, and an engine rotational speed, wherein the engine rotational speed includes a number of engine revolutions per unit time; and wherein the external diagnostic apparatus:
- calculates an amount of fuel consumed during the detection of the acceleration, using the amount of injected fuel and the engine rotational speed;
- calculates a traveled distance of the vehicle using the acceleration applied to the external diagnostic apparatus; and
- calculates a fuel mileage of the vehicle using the amount of consumed fuel and the traveled distance.

3. The vehicle diagnostic method according to claim 2, wherein the external diagnostic apparatus displays data representing how the vehicle is accelerated and decelerated using the acceleration applied to the external diagnostic apparatus, together with data representing the fuel mileage.

4. The vehicle diagnostic method according to claim 1, wherein the acceleration detecting unit is detachably connected to a main body of the external diagnostic apparatus.

5. An external diagnostic apparatus provided on a vehicle for acquiring operation information of the vehicle through an electronic control unit mounted on the vehicle via data communication with the electronic control unit from outside of the vehicle, and making at least one of a performance diagnosis of the vehicle, a fault diagnosis of the vehicle, and a driving technique diagnosis of a driver of the vehicle, the external diagnostic apparatus comprising:

an acceleration detecting unit, connected detachably to or incorporated in a main body of the external diagnostic apparatus, for detecting an acceleration applied to the external diagnostic apparatus while the vehicle is traveling with the external diagnostic apparatus and the acceleration detecting unit mounted on the vehicle;

wherein the external diagnostic apparatus makes at least one of a performance diagnosis of the vehicle, a fault diagnosis of the vehicle, and a driving technique diagnosis of the driver of the vehicle, using the acceleration that is applied to the external diagnostic apparatus, and is detected by the acceleration detecting unit and directly sent to the external diagnostic apparatus without any intervention from the electronic control unit, and the operation information of the vehicle acquired through the electronic control unit.

6. An external diagnostic apparatus for acquiring operation information of a vehicle through an electronic control unit mounted on the vehicle via data communication with the electronic control unit from outside of the vehicle, and making at least one of a performance diagnosis of the vehicle, a fault diagnosis of the vehicle, and a driving technique diagnosis of a driver of the vehicle, the external diagnostic apparatus comprising:

an acceleration detecting unit for detecting an acceleration applied to the external diagnostic apparatus while the vehicle is traveling with the external diagnostic apparatus and the acceleration detecting unit mounted on the vehicle;

wherein the external diagnostic apparatus makes at least one of a performance diagnosis of the vehicle, a fault diagnosis of the vehicle, and a driving technique diagnosis of the driver of the vehicle, using the acceleration applied to the external diagnostic apparatus detected by the acceleration detecting unit and the operation information of the vehicle acquired through the electronic control unit, wherein the vehicle comprises an engine vehicle; and the operation information which is acquired from the vehicle includes an amount of injected fuel, wherein the amount of injected fuel comprises an amount of injected fuel per unit time or per unit number of engine revolutions and an engine rotational speed, wherein the engine rotational speed includes a number of engine revolutions per unit time; and wherein the external diagnostic apparatus:
- calculates an amount of consumed fuel, using the amount of injected fuel and the engine rotational speed;
- calculates a traveled distance of the vehicle using the acceleration applied to the external diagnostic apparatus detected by the acceleration detecting unit; and
- calculates a fuel mileage of the vehicle using the amount of consumed fuel and the traveled distance.

7. The external diagnostic apparatus according to claim 6, further comprising:
a display unit for displaying data representing how the vehicle is accelerated and decelerated using the acceleration applied to the external diagnostic apparatus, together with data representing the fuel mileage.

8. The external diagnostic apparatus according to claim 5, wherein the acceleration detecting unit is detachably connected to a main body of the external diagnostic apparatus.

* * * * *